Figure 1:
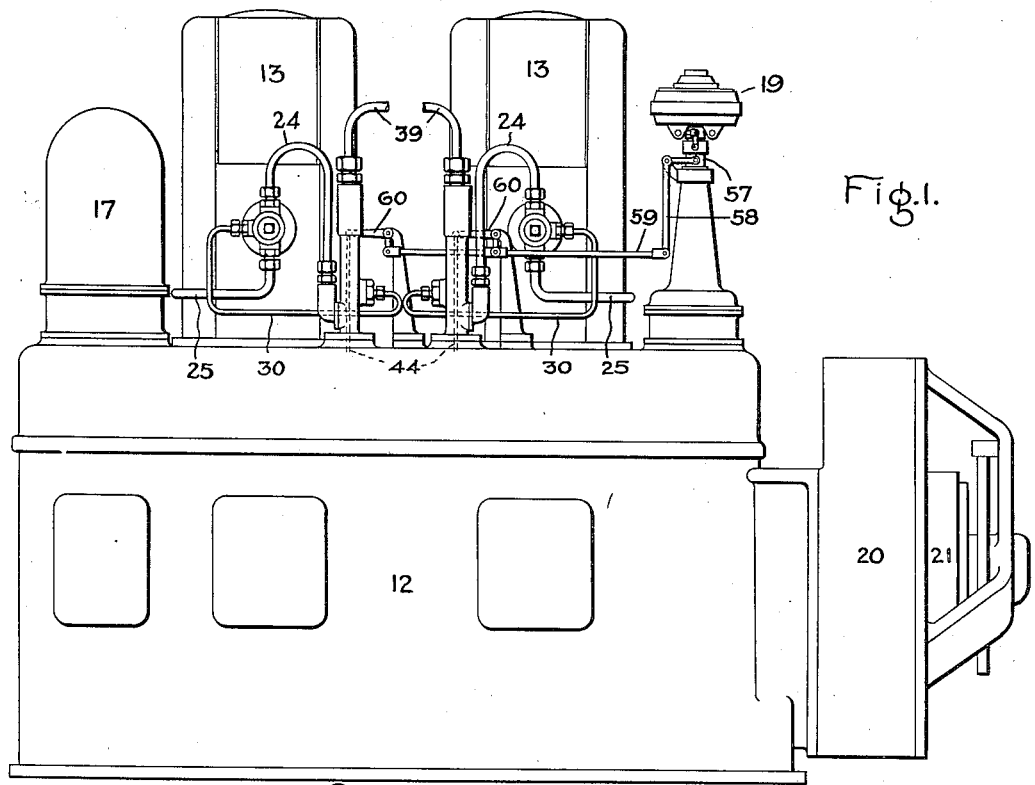

G. H. KAEMMERLING.
GOVERNING AND VALVE OPERATING MECHANISM FOR ENGINES.
APPLICATION FILED MAY 4, 1914.

1,246,605.

Patented Nov. 13, 1917.
5 SHEETS—SHEET 1.

Witnesses:
Marcus L. Byng
J. Ellis Glen

Inventor:
Gustav H. Kaemmerling,
by
His Attorney.

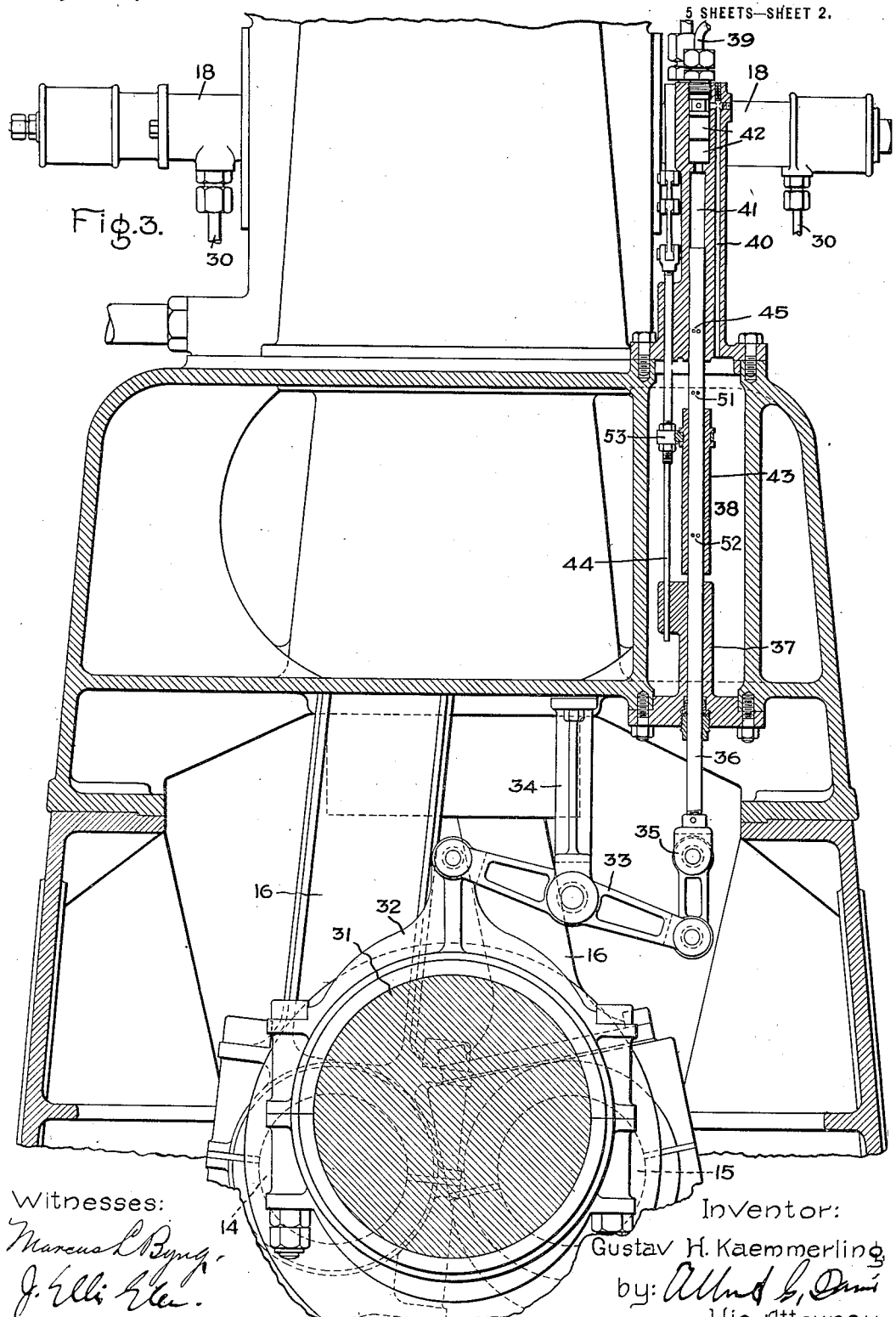

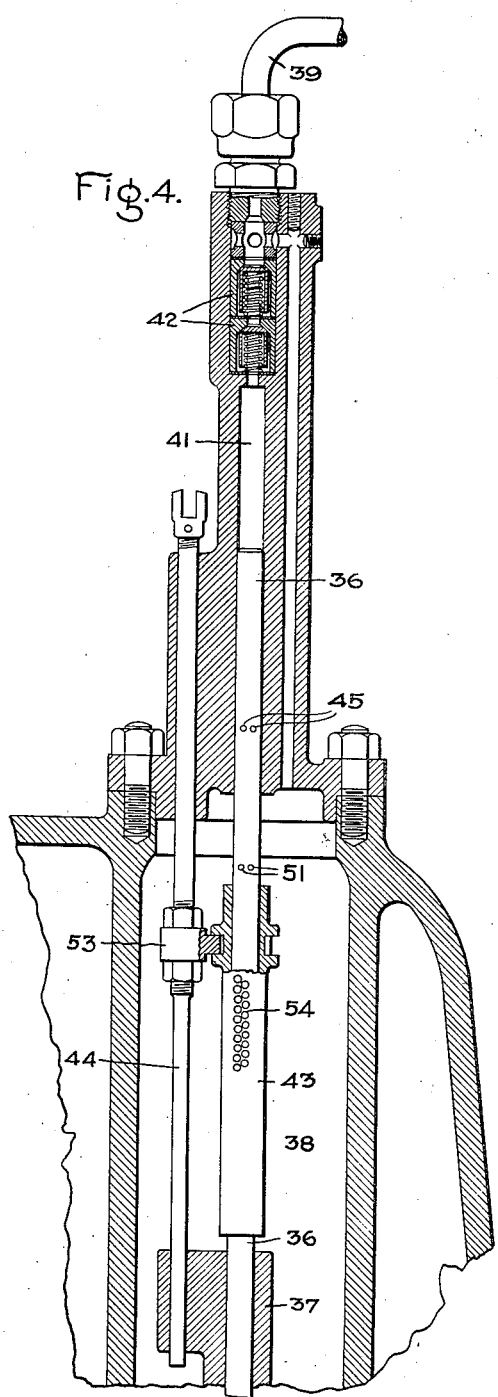
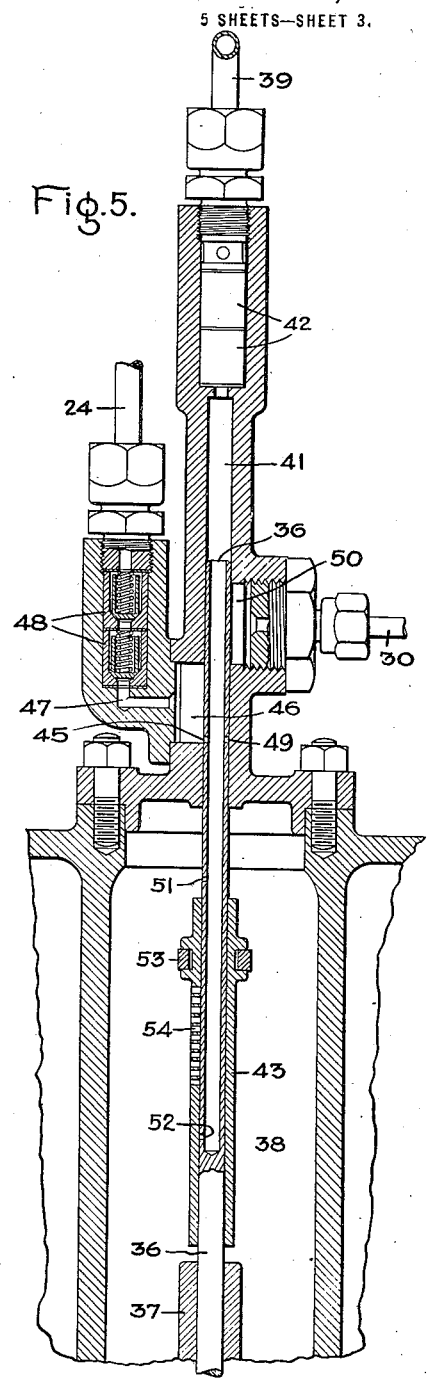

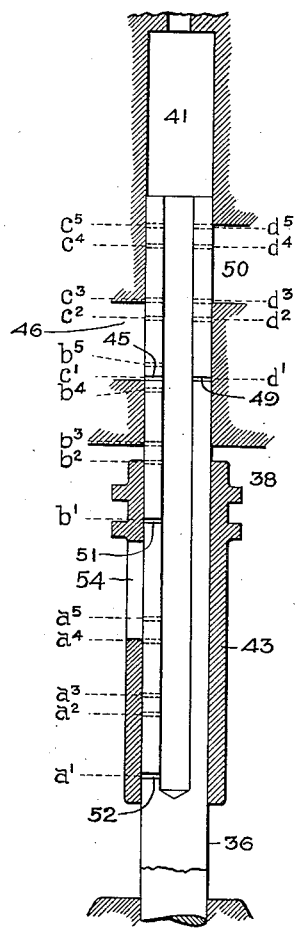
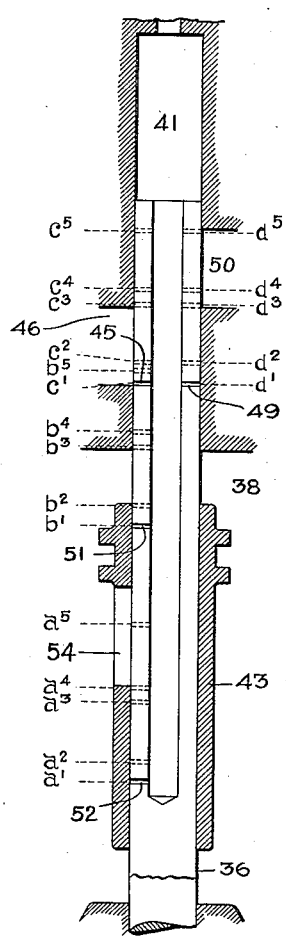
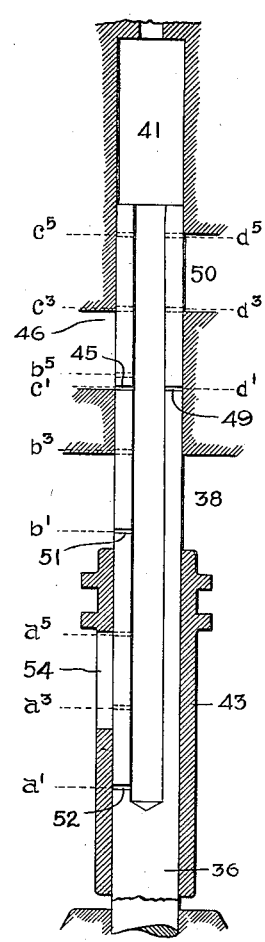

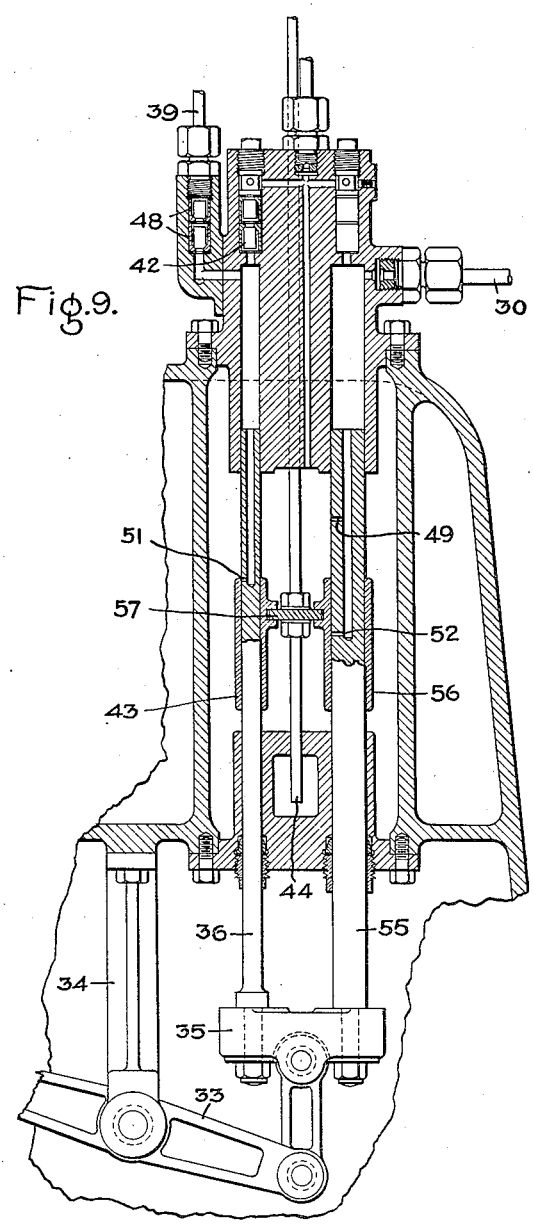

UNITED STATES PATENT OFFICE.

GUSTAV H. KAEMMERLING, OF ERIE, PENNSYLVANIA, ASSIGNOR TO GENERAL ELECTRIC COMPANY, A CORPORATION OF NEW YORK.

GOVERNING AND VALVE-OPERATING MECHANISM FOR ENGINES.

1,246,605.   Specification of Letters Patent.   Patented Nov. 13, 1917.

Application filed May 4, 1914.  Serial No. 836,144.

*To all whom it may concern:*

Be it known that I, GUSTAV H. KAEMMERLING, a citizen of the United States, residing at Erie, in the county of Erie, State of Pennsylvania, have invented certain new and useful Improvements in Governing and Valve-Operating Mechanism for Engines, of which the following is a specification.

The present invention relates to internal combustion engines using heavy oil as a fuel and operating on the high compression plan, and specifically it relates to the means for supplying fuel to the combustion chamber in regulated amounts and to the means for actuating the fuel valve.

At the present time the common commercial practice in internal combustion engines is to utilize some sort of a mechanical means for positively opening the fuel valve; and also to utilize a fuel pump and governing means therefor which is entirely separate from the valve actuating means.

My invention has for its object to improve this type of engine by doing away with the usual cam shaft, levers, etc., and utilizing in its stead an improved hydraulic means for actuating the fuel valve or valves. In my improved arrangement the fuel pump is arranged to supply the necessary amount of fuel to the engine and also the fluid pressure necessary to actuate the fuel valve which controls the passage of fuel from the injector to the combustion chamber.

In connection with the foregoing, a governing or controlling means is provided which controls both functions of the pump. This means will generally be responsive to a speed governor in a constant speed engine, and to hand control in a variable speed engine, although various modifications are possible.

An important feature of my improved arrangement resides in the fact that the effective pump stroke always starts at the same point with respect to the position of the working piston, but ends at a different point as determined by a governor or other means. Also, that the fuel valve always starts to open at the same point with respect to said piston, the closure of the valve being variable as determined by the speed governor or other means. A given setting of the governor also causes the stroke of the valve actuator to correspond to the effective stroke of the pump. By reason of these two features fuel is always admitted to the combustion chamber under the most advantageous conditions and undue chilling of the highly heated air in the combustion chamber, due to an excess of the so-called blast or injection air, is prevented, which makes for improved economy under loads less than the maximum. It also results in a saving in the use of the highly compressed blast air for injecting purposes, thereby decreasing the energy required to drive the air compressor.

Figure 2:
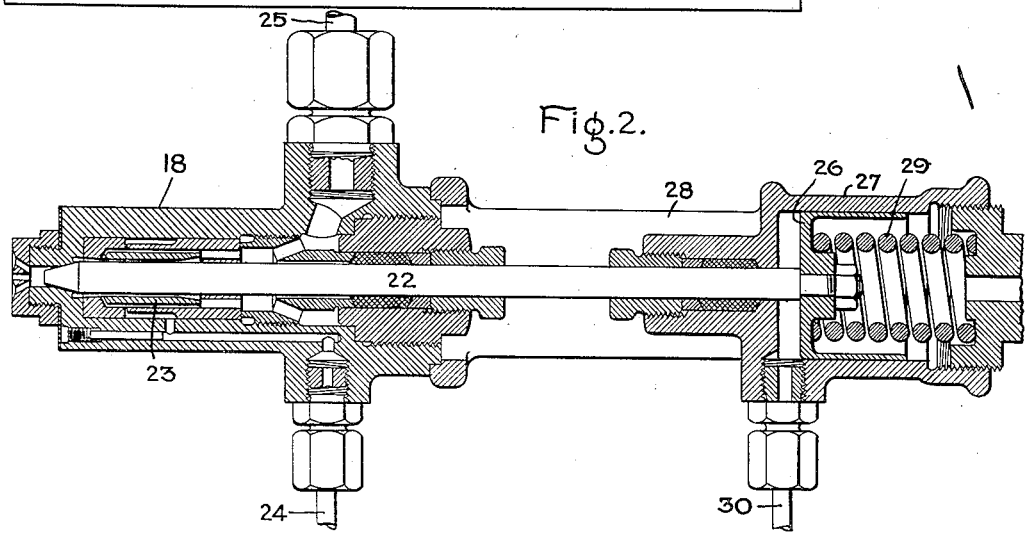

In the accompanying drawings which are illustrative of my invention, Figure 1 is a view in side elevation of a heavy oil engine fitted with my improved mechanism; Fig. 2 is a sectional view of a fuel injector; Fig. 3 is a view partially in section and partly in elevation of the engine, the view being taken looking at one end of the main shaft; Fig. 4 is a sectional view of the pump; Fig. 5 is also a sectional view of the pump taken at right angles to that of Fig. 4; Figs. 6, 7 and 8 are diagrammatic views illustrating the operation of the apparatus; and Fig. 9 is a sectional view of a slight modification.

12 indicates the base of the engine and 13 the cylinders thereof. I have illustrated a type of engine in which each cylinder is provided with oppositely moving pistons but my invention is not limited thereto. In Fig. 3 is shown the cranks 14 and 15 to which the pistons are connected as by rods 16. 17 indicates the housing for the air compressor which furnishes air for scavenging purposes when the engine operates on the two cycle plan. It also supplies the blast air for forcing fuel from the injectors 18, Fig. 2, into the combustion chambers of the cylinders. On the right hand end of the base is a speed governor 19 which is driven by the main shaft through suitable driving means. To the base is attached the field magnet 20 of an electric generator, the rotor 21 of which is driven by the main shaft.

Referring to Fig. 2, I have illustrated a fuel injector invented by Hermann Lemp and suitable for practising my invention, in which 22 is the fuel valve and 23 the means for breaking up the fuel into fine particles as the blast air rushes forward into the combustion chamber when the valve is open. Each cylinder may have one or more injectors. Fuel enters the injector by the pipe 24 and blast air by the pipe 25. On the end of the valve stem is a piston 26 located in a cylinder 27, the latter being supported by arms 28 from the casing of the injector. Inside the cylinder is an adjustable coiled compression spring 29 that tends at all times to hold the valve on its seat. Fluid, such as fuel oil, is admitted under pressure to the cylinder to actuate the piston against the spring by the pipe 30. For convenience of illustration and description, the pipes 24, 25 and 30 are shown in the same axial plane.

Referring to Fig. 3, 31 indicates an eccentric on the main shaft and surrounding it is a strap 32 that is pivotally connected to the walking beam 33, the latter being supported on a bracket 34 depending from the engine frame or base. To the other end of the beam is pivotally attached a crosshead 35 for actuating the plunger 36 which serves the double purpose of supplying fuel to the injector 18 and fluid for actuating the piston 26 and fuel valve, as will appear more fully hereinafter. The plunger has a stroke of constant length and is guided at its lower end in the boss 37 located within the fuel supply chamber 38 formed in a suitable casing. This chamber is normally kept full of fuel by the pipe 39 connected to a suitable source, such as an elevated tank, and the vertical passage 40. The upper end of the plunger is located in a cylinder 41 and above it are suction valves 42, Figs. 3 and 4, arranged in series to reduce the liability of leakage. Surrounding the plunger and located in the fuel chamber 38 is a sleeve 43 which is connected by the rod 44 and suitable links and rods with the speed governor 19 of Fig. 1. As the eccentric rotates it alternately depresses the plunger for its suction stroke and raises it for its discharge stroke.

Referring more especially to Figs. 4 and 5, the upper portion of the plunger 36 is hollow and fuel from the source of supply enters through the open end and also through any of the ports at its lower end which are uncovered by the sleeve 43. The plunger is provided with one or more lateral ports 45 through which fuel flows on the discharge stroke into the long and relatively narrow chamber 46 and from which it flows by passage 47, past the discharge valves 48 to the pipe 24 leading to the injector. The plunger is further provided with one or more ports 49 through which fluid under pressure passes into the long and relatively narrow chamber 50, the latter communicating with the pipe 30 leading to the piston 26 for opening the fuel valve at predetermined times. Both of the ports 45 and 49 are within the pump cylinder. Below the cylinder and above the governor actuated sleeve 43 the plunger is provided with a port 51 through which fluid can escape from the cylinder and piston into the chamber 38 when the upper end of said sleeve uncovers the port. The plunger is also provided with a second port 52 located below the cylinder and controlled by a port or ports in the sleeve. The function of these ports will be described in detail later.

The governor actuated sleeve 43 has a groove in its upper end to receive the fork 53, the latter being adjustably mounted on the rod 44. In the sleeve are numerous ports 54 arranged one above the other and staggered to obtain continuous opening without unduly weakening the sleeve.

Referring particularly to Figs. 6 to 8, the operation will be described. In Fig. 6 the parts are shown in the starting position which is also the position of maximum fuel delivery and maximum operating of the fuel valve 22, Fig. 2. Fig. 7 illustrates what may be termed the mean position, and Fig. 8 the runaway position where the pump is not delivering any fuel.

When the plunger 36 descends on its suction stroke fuel enters the cylinder and hollow end of the plunger through the suction valves 42 and also through the lateral ports therein. On the upward stroke fuel is discharged through the port 45 to the chamber 46, Fig. 5, communicating with the injector, providing the ports 51 and 52 are covered by the sleeve. Assuming that they are so covered fuel is discharged from the port 45 to the chamber 46. This continues while port 49 travels from position $d'$ to $d^2$ or until port 51 is uncovered. Shortly after this port 49 opens to discharge fluid under high pressure to the chamber 50 and pipe 30 leading to the valve operating piston. Before this action takes place port 51 is covered by the cylinder wall. This causes the piston to open the valve and the blast air from pipe 25 drives the fuel, previously delivered to the injector, before it into the combustion chamber of the working cylinder where it is ignited by the high temperature of the compressed air therein. This action continues until port 52 registers with ports 54 which, for convenience, have been shown as a vertical slot. As soon as this happens the pressure within the cylinder and plunger is relieved and the spring 29 closes the fuel valve of the injector. It will be apparent from the foregoing that the pump has a double function; i. e., first delivering fuel to the injector, and later opening its valve. As thus far described, the same amount of fuel would be discharged on each stroke and the valve would have the same opening. To provide for variable amounts of fuel responsive to load changes the sleeve 43 is made movable on the plunger in response to the action of the speed governor 19, or other means. Assuming the case illustrated in Fig. 7 where the sleeve has been lowered, indicating a lesser demand for fuel, port 45 will begin to deliver fuel to the injector at the same point with respect to the position of the working piston or pistons and the main shaft because the plunger is driven from said shaft and because the lower wall of chamber 46 is fixed in position. Fuel will continue to be discharged to the injector until the port 51 passes from position $b'$ to just beyond position $b^2$. At this instant fuel will pass from the plunger into the low pressure chamber 38 and none will pass into high pressure chamber 46. This discharge to the chamber 38 continues until port 51 assumes position $b^3$ after which fluid will be discharged through port 49 to chamber 50 for opening the fuel valve 22 of the injector. The valve continues its opening movement until port 52 registers with port 54 in the sleeve when the pressure in chamber 50 is relieved and spring 29 acting in the piston 26 closes the valve. It will thus be seen that the fuel valve always opens at the same point with respect to the position of the working piston of the engine and closes at a variable point, earlier or later as determined by the position of the governing sleeve. Briefly stated the port 51 controls the amount of fuel admitted to the injector, and port 52 the action of the fuel valve, the blast air blowing fuel from the injector at each opening of the valve as is usual in engines of this character. For convenience various positions of the port 52 are indicated by the dotted lines $a'$, $a^2$, $a^3$, $a^4$ and $a^5$; of port 51 by dotted lines $b'$, $b^2$, $b^3$, $b^4$ and $b^5$; of port 45 by dotted lines $c'$, $c^2$, $c^3$, $c^4$ and $c^5$, and of port 49 by dotted lines $d'$, $d^2$, $d^3$, $d^4$ and $d^5$. Of course there are an infinite number of intermediate positions but the above will serve as illustrations. In Fig. 8 the governing sleeve 43 is shown in its lowest position. As the plunger 36 rises the port 51 remains uncovered from position $b'$ to $b^3$ and since this travel is the same as that between $c'$ and $c^3$ of the port 45 no fuel will be delivered to the chamber 46 because it will freely escape from port 51. During the portion of the stroke that port 49 is traveling from position $d'$ to $d^3$ port 52 is traveling from position $a'$ to $a^3$. During the portion of the stroke that port 49 is traveling from position $d'$ to $d^3$ the port 52 is traveling from position $a^3$ to $a^5$ and fluid escapes through the sleeve port 54 from which it follows that no fluid under pressure will be delivered to the chamber 50 and hence the piston 26, Fig. 2, cannot open the fuel valve 22. For convenience this may be termed the runaway position of the parts when no fuel is delivered to the injector and the fuel valve remains closed.

This construction has the advantage of simplicity in that it avoids the use of a cam shaft and mechanical valve actuators. It requires the use of one pump only for each cylinder and that is a necessary part of such an engine. The governing means for the pump also controls the action of the fuel valve actuating means, causing said valve to close later or earlier as desired but always opening under normal running conditions at the same point. By arranging the parts as described the fuel which is supplied to the engine is also utilized as a working fluid to actuate the fuel valve. Further all fluid exhausting from the control ports returns to the same chamber 38. The sleeve 43 being in oil is always well lubricated. I aim to reduce the leakage between the sleeve and plunger and between the latter and cylinder to a small value by making good working fits, but if such leakages do occur they merely cause the governor sleeve 43 to take a higher position for the same engine speed. That is to say, if the leakage amounts to 25% of the displacement of the plunger the governor sleeve will stand 25% higher than it otherwise would for the same speed, all leakage returning to the chamber 38.

In some cases it is desirable to shorten the length of the fuel pump plunger and coöperating parts. This may be done, as in Fig. 9, by providing a pump having two short plungers 36 and 55, the former supplying fuel to the injector and the latter supplying fluid to the valve actuator 26. Each plunger is hollow for a portion of its length and has its own cylinder. The fuel pump plunger has only a single discharge port 51. Fuel is admitted from the source of supply by the suction valves 42 and is delivered through the discharge valves 48. The valve controlling plunger 55 has two ports 49 and 52 for controlling its effective action on the fuel valve 22 and its piston 26. Two sleeves 43 and 56 are required in this case, the former surrounding plunger 36 and the latter plunger 55. Although two sleeves are provided their effective action is in all respects equivalent to the single sleeve of the preceding illustrations. Both sleeves are actuated by the collar 57 mounted on the rod 44 and as shown are in about their lowest positions. As the action is similar to that heretofore described, further description is believed to be unnecessary.

The construction shown in Fig. 9 possesses certain advantages over that shown in the other figures in that it shortens the pump apparatus as a whole and simplifies the formation and machining of the cylinder. In the previous figures the same amount of fluid is available for lifting the valve as is delivered to the injector. This means then a relatively small amount of fluid under high pressure. By using two plungers one may be made as much larger than the other as desired to afford a considerable supply of fluid at the desired pressure for actuating the piston 26.

In Fig. 1 is shown two pumps, one for each working cylinder of the engine, and obviously the number can be increased or decreased depending upon said number. 57 indicates the sliding collar of the governor whose position changes in response to changes in engine speed as is customary. This motion is transmitted to the bell-crank lever 58 whose lower end is connected to the horizontal rod 59. This rod is connected by small bell-crank levers 60 to the rods 44, shown in dotted lines, that raise and lower the sleeves 43 of the principal figures and the divided or two-part sleeve 43—56 of Fig. 9. As arranged the collar 57 moves upward with an increase in speed and the sleeves move down thereby shortening the effective pump strokes and causing an earlier release of the fuel valve actuator 26. In other words, as the speed increases due to decrease in load, the valve 22 is held open for a shorter period than for lower speeds and heavier loads.

My invention is described in connection with what is commonly called a constant speed engine. If it is desirable to operate the engine through wide variations in speed the character of the speed governor would be modified accordingly. If the engine be arranged to drive a self propelled vehicle where hand control of the speed is desirable, the speed governor 19 will be omitted and the rod 59 moved to and fro by a hand controlled device.

For starting the engine I may utilize any of the well known means for the purpose.

I have described a separate air compressor for supplying blast air to the pipe 25, but my invention is not limited thereto. Any means for causing the proper amount of fuel to pass from the injector into the combustion chamber when the valve opens will be satisfactory.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:—

1. In combination, an internal combustion engine, a fuel injector, a valve therefor, a pump arranged to deliver fuel to the injector during the first part of its working stroke and to actuate the valve during a later part of said stroke, and a governing means for regulating the amount of fuel delivered to the injector and the period of opening of said valve.

2. In combination, an internal combustion engine, a fuel injector therefor, a valve controlling the passage of fuel from the injector to the engine, an actuator for the valve, a pump having hollow ported plunger means for supplying fuel to the injector and fluid to the actuator, valve means for the pump, and sleeve means surrounding the plunger means for controlling the passage of fluid through the plunger ports.

3. In combination, an internal combustion engine, a fuel injector therefor, a valve controlling the passage of fuel from the injector to the engine, an actuator for the valve, a pump having hollow ported plunger means for supplying fuel to the injector and fluid to the actuator, valve means for the pump, sleeve means surrounding the plunger means for controlling the passage of fluid through the plunger ports, and a speed governor that is driven by the engine for adjusting the position of the sleeve means.

4. In combination, an internal combustion engine, a fuel injector therefor, a valve controlling the passage of fuel from the injector to the engine, an actuator for the valve, a pump comprising a cylinder, valve means and hollow plunger means, the latter having delivery and relief ports, said pump supplying fuel to the injector and fluid to the actuator, a chambered casing with which the cylinder communicates and into which the plunger means extends, a sleeve means located in the chamber for controlling the relief ports, and means for adjusting the position of the sleeve.

5. In combination, an internal combustion engine, a fuel injector, a valve therefor, means for actuating the valve, a pump for supplying fuel to the injector and comprising a cylinder, a tubular ported plunger and valve means, a chambered casing into which the cylinder opens, said plunger extending into the chamber, a sleeve that surrounds the plunger for controlling one of its ports and is located in the chamber, a means for moving the sleeve axially on the plunger to control the passage of fluid through the port, and a conduit for supplying fluid to and keeping the chamber filled.

6. In combination, an internal combustion engine, a fuel injector therefor, a valve controlling the passage of fuel from the injector into the engine, a pump for supplying fuel to the injector comprising a hollow ported plunger, a cylinder and suction and discharge valves, a means for imparting a stroke of constant length to the plunger, a sleeve mounted on the plunger outside of the cylinder for controlling the escape of fluid from the plunger, and means for adjusting the sleeve longitudinally on the plunger to regulate the amount of fuel which is delivered by the plunger on its discharge stroke to the injector and the amount permitted to escape through the port therein.

7. In combination, an internal combustion engine, a fuel injector therefor, a valve controlling the passage of fuel from the injector into the engine, an actuator for the valve, a pump comprising a cylinder, and a hollow ported plunger, there being chambers in the cylinder that register with certain of the ports on each discharge stroke of the plunger, conduits conveying fuel from the chambers to the injector and actuator, a means adjustable with respect to the plunger for controlling the escape of fluid from the interior of the plunger, and a device for actuating said means.

8. In combination, an internal combustion engine, a fuel injector therefor, a valve controlling the passage of fuel from the injector into the engine, an actuator for the valve, a pump cylinder having chambers one beyond the other, a hollow plunger having two sets of ports, one set controlling the passage of fluid to one chamber and the other set to the second chamber, means for actuating the plunger, conduits conveying fluid from the chambers to the injector and valve actuator, a sliding ported member which controls certain ports of each of said sets, and a means for adjusting said member.

9. In combination, an internal combustion engine, a fuel injector therefor, a valve controlling the passage of fuel from the injector into the engine, an actuator for the valve, a pump cylinder having chambers one beyond the other, a hollow plunger having two sets of ports, one set controlling the passage of fluid to one chamber, and the other set to the second chamber, means for actuating the plunger, conduits conveying fluid from the chambers to the injector and valve actuator, a sleeve that slides on the plunger and has a port between its ends, said ports and ends of the sleeve acting to control the plunger ports, and means for adjusting the sleeve.

10. In combination, an internal combustion engine, a fuel injector, a valve therefor, a pump which supplies fuel to the injector during the early part of its working stroke and fluid to open the valve during a later part of the stroke, said pump having hollow ported plunger means, a means coöperating with certain of said ports to control the amount of fluid passing through the ports, and a device for adjusting said means.

11. In combination, an internal combustion engine, an injector, a valve therefor, a valve actuator, a pump having a two-part plunger, one part supplying fuel to the injector and the other fluid under pressure to the actuator, said parts acting successively, and means for regulating the amount of fuel delivered to the injector and the period during which the valve is open.

In witness whereof, I have hereunto set my hand this first day of May, 1914.

GUSTAV H. KAEMMERLING.

Witnesses:
HERMANN LEMP,
O. T. FOUCHE.